United States Patent [19]
Tiliander

[11] 3,974,719
[45] Aug. 17, 1976

[54] MECHANICAL POWER TRANSMISSION ASSEMBLY

[75] Inventor: Gosta Ador Evert Tiliander, Malmo, Sweden

[73] Assignee: Kommanditbolaget United Stirling (Sweden) AB & Co., Malmo, Sweden

[22] Filed: Apr. 2, 1975

[21] Appl. No.: 564,274

[52] U.S. Cl. .............. 74/810; 74/665 F; 74/789; 74/6; 192/48.92
[51] Int. Cl.² .......... F16H 5/52; F16H 37/06; F16H 57/10; F02N 15/00
[58] Field of Search ..... 74/665 F, 665 GA, 665 GE, 74/665 K, 665 P, 789, 6, 7 E, 810; 192/42, 48.92; 60/656, 517

[56] References Cited
UNITED STATES PATENTS

| | | | |
|---|---|---|---|
| 2,458,070 | 1/1949 | Gilbert | 74/789 |
| 2,600,762 | 6/1952 | Hartz | 74/810 |
| 2,972,911 | 2/1961 | Volk, Jr. et al. | 74/810 |
| 3,251,442 | 5/1966 | Aschauer | 74/6 X |
| 3,270,207 | 8/1966 | Stockton | 74/810 |

Primary Examiner—Samuel Scott
Assistant Examiner—Lance W. Chandler
Attorney, Agent, or Firm—Laurence R. Brown

[57] ABSTRACT

A mechanical power transmission assembly for starting Stirling engines has a power input shaft driven by a starter motor and a plurality of power take off devices comprising at least two one-way clutches coupled to the shaft, one of which includes a reduction gear. A further power take off device comprises a third one-way clutch coupled to transmit torque from the second power take off device to the first power take off device. Thus a blower may be rotated at the same speed as the starter motor, and a starter gear at a lower speed until the engine speed increases, so that the blower motor can then be driven by the Stirling engine and the starter motor switched off.

1 Claim, 1 Drawing Figure

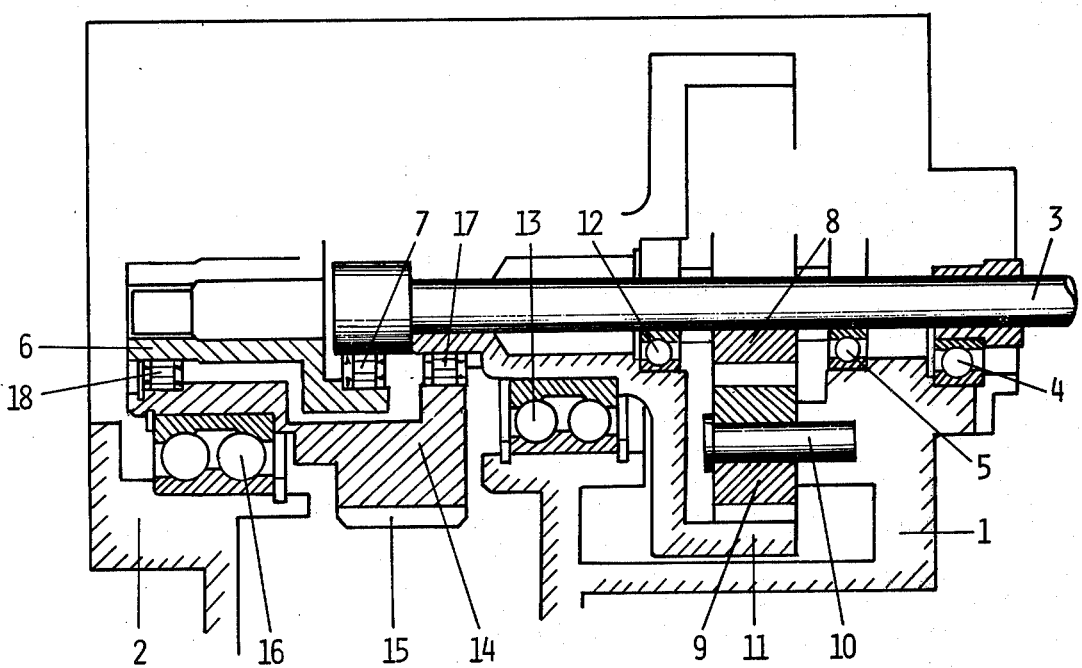

MECHANICAL POWER TRANSMISSION ASSEMBLY

This invention relates to a mechanical power transmission assembly of the kind (herein called "the kind defined") comprising a power input shaft and at least two power take-off devices which serve for transmitting power from the power input shaft to power-consuming devices.

The power-consuming devices may, for example, be a combustion engine which is being started and a blower to supply combustion air for the engine, and one object of the invention is to provide an assembly of the kind defined which is suitable for use in a device for starting a Stirling-cycle hot gas engine.

As is well known, a Stirling-cycle hot gas engine cannot run at speeds below a certain limit. Consequently a starter motor must be used for giving the engine a sufficient speed during starting.

Most Stirling engines use heat obtained by burning fuel with combustion air, and such engines need a combustion air blower during starting as well as during normal operation. Other auxiliary devices, for example lubrication pumps, will also be needed during starting.

The lower speed limit which the engine must be given during starting is not particularly high — e.g. it may be 10 or 20 per cent of the normal engine speed. However, the speed of the combustion air blower should be almost as high as its normal speed in order to obtain a short starting period. Therefore it has been proposed to use separate starter motors for the engine and for its auxiliary devices. However, this may not be suitable for engines which should be kept within narrow space limits. It is also known to provide a single starter motor for the engine and to provide a variable ratio power transmission system between the engine and the air blower. It is, however, difficult to provide a reliable variable power transmission system giving the right and sufficient amounts of air at any time and at any load.

With the above remarks in mind, it will appear from the following description how the invention provides an assembly of the kind defined suitable for use in a device for starting a Stirling-cycle hot gas engine.

According to the invention there is provided a power transmission assembly of the kind defined herein, including three power trains (i.e. three paths through which power can be transmitted) characterized in that the first of said power trains comprises said power input shaft and a first one-way clutch able to transmit torque only in one direction from the power input shaft to a first power take off device, that the second of said power trains comprises said power input shaft and a reduction gear and a second one-way clutch able to transmit torque only in one direction from the power input shaft to a second power take-off device, and that the third of said power trains comprises the said second power take-off device and a third one-way clutch able to transmit torque only in one direction from the said second power take-off device to the said first power take-off device.

How the invention may be put into practice is described in more detail with reference to the accompanying drawing, which shown schematically and in vertical section an assembly according to the invention.

The drawing shows a housing 1 adapted to be secured to a stationary part 2 of a Stirling cycle hot gas engine (not otherwise shown).

A power input shaft 3, which is adapted to be driven by a conventional electric starter motor (not shown) is mounted in the housing 2 by two ball bearings 4, 5. At its extreme left-hand end the said shaft 3 can be connected to a first power take-off device 6 via a first one-way clutch 7 which is able to transmit torque only in one direction from the shaft 3 to the device 6. The shaft 3, the clutch 7 and the first power take-off device 6 constitute a first power train. If the shaft 3 is driven by an electric starter motor and the device 6 is connected to a combustion air blower (not shown) the first power train will serve to transmit power from the starter motor to the blower, which may be rotated at the same speed as the starter motor.

A second power train is formed by a gear wheel 8 rigidly secured to the shaft 3 and meshing with planet wheels 9 mounted on pivot pins 10 secured to the housing 1. The planet wheels 9 mesh with teeth in an inner toothed surface of a sleeve 11 guided by ball bearings 12 and 13 relative to the shaft 3 and to the housing 1 respectively. A second power take-off device 14 is provided with gear teeth 15 adapted to mesh with teeth on a starter wheel (not shown) on the Stirling engine. The device 14 is journalled in the housing 2 by a ball bearing 16 and is connected to the sleeve 11 via a second one-way clutch 17, the latter being able to transmit torque only in one direction from the sleeve 11 to the power take-off device 14.

A third power train comprises a third one-way clutch 18 between the second power take-off device 14 and the first power take-off device 6, said clutch 18 being able to transmit torque only in one direction from the device 14 to the device 6.

Assuming that the shaft 3 is driven by an electric starter motor and that the device 6 is connected to an air blower and that the teeth 15 mesh with a Stirling engine starter wheel, the assembly as described above and shown in the drawing will operate as follows:

During the initial part of the starting operation of the Stirling-cycle hot gas engine the electric starter motor will transmit torque to the combustion air blower via the first power train, i.e. the elements 3, 7 and 6. Simultaneously the starter motor will transmit torque to the Stirling engine via the second power train, i.e. the elements 3, 8, 9, 11, 17, 14 and 15. The engine will be rotated at a speed which is lower compared with the speed of the blower.

The Stirling engine will need less torque with increasing speed, and as soon as a certain speed is obtained the engine will produce torque and rotate the power take-off device 14 at a speed higher than that of the sleeve 11. The clutch 17 will now cease to transmit torque. The speed of the Stirling engine will continue to increase ad as soon as the speed of the device 14 exceeds that of the shaft 3 the clutch 18 will be engaged and the clutch 7 will be disengaged, and thus the device 6 and the air blower are now driven by the Stirling engine. The starter motor may now be switched off, as the starting operation has been completed.

What is claimed is:

1. A power transmission assembly of the kind defined herein, including three power trains (i.e. three paths through which power can be transmitted) characterized in that the first of said power trains comprises said power input shaft and a first one-way clutch able to transmit torque only in one direction from the power input shaft to a first power take off device, that the second of said power trains comprises said power input shaft and a reduction gear and a second one-way clutch able to transmit torque only in one direction from the power input shaft to a second power take-off device, and that the third of said power trains comprises the said second power take-off device and a third one-way clutch able to transmit torque only in one direction from the said second power take-off device to the said first power take-off device wherein the reduction gear comprises a gear wheel secured to the power input shaft and meshing with planet wheels rotating about stationary pivot pins, the planet wheels mesh with teeth in a sleeve, and the second one-way clutch acts between the sleeve and the second power take-off device.

* * * * *